United States Patent [19]
Petroff

[11] Patent Number: 5,198,989
[45] Date of Patent: *Mar. 30, 1993

[54] SEWER FLOW MEASUREMENT CONTROL SYSTEM

[75] Inventor: Alan M. Petroff, Huntsville, Ala.

[73] Assignee: ADS Environmental Services, Inc., Huntsville, Ala.

[*] Notice: The portion of the term of this patent subsequent to Jun. 4, 2008 has been disclaimed.

[21] Appl. No.: 537,369

[22] Filed: Jun. 13, 1990

Related U.S. Application Data

[60] Continuation-in-part of Ser. No. 440,502, Nov. 17, 1989, Pat. No. 5,020,374, and a continuation-in-part of Ser. No. 285,321, Dec. 13, 1988, Pat. No. 4,933,833, which is a division of Ser. No. 755,062, Jul. 15, 1985, Pat. No. 4,791,547, which is a division of Ser. No. 473,689, Mar. 9, 1983, Pat. No. 4,530,045, which is a continuation-in-part of Ser. No. 190,036, Sep. 23, 1980, Pat. No. 4,386,409.

[51] Int. Cl.⁵ .............................................. G01F 1/66
[52] U.S. Cl. ...................................... 364/510; 73/227; 73/861.25

[58] Field of Search ............... 364/509, 510, 565, 558, 364/564; 73/196, 227, 861.18, 861.25; 128/661.07, 661.09, 662.01

[56] References Cited

U.S. PATENT DOCUMENTS

| | | | |
|---|---|---|---|
| 4,083,246 | 4/1978 | Marsh | 73/227 |
| 4,334,543 | 6/1982 | Fehr | 364/510 |
| 4,386,409 | 5/1983 | Petroff | 364/510 |
| 4,397,191 | 8/1983 | Forden | 73/227 |
| 4,790,323 | 12/1988 | Leavitt et al. | 73/861.25 |
| 4,866,613 | 9/1989 | Amemiya et al. | 73/861.25 |
| 4,993,418 | 2/1991 | Weaver et al. | 73/861.25 |
| 5,020,374 | 6/1991 | Petroff et al. | 73/861.25 |
| 5,065,764 | 11/1991 | Nakamura et al. | 73/861.25 |

Primary Examiner—Gary Chin
Attorney, Agent, or Firm—Brumbaugh, Graves, Donohue & Raymond

[57] ABSTRACT

A sewer flow monitoring system wherein the volume of flow is determined from the depth of fluid in a pipe together with the average velocity of flow through the pipe as determined by detecting the peak velocity from particles flowing in sewage at different velocities and then determining average velocity to be approximately 90% of the peak velocity.

12 Claims, 7 Drawing Sheets

SEWER FLOW MEASUREMENT CONTROL SYSTEM

CROSS REFERENCE OF RELATED APPLICATIONS

This application is a continuation-in-part of U.S. patent application Ser. No. 285,321, filed Dec. 13, 1988, now U.S. Pat. No. 4,933,833, which is a division of U.S. patent application Ser. No. 06755,062, filed Jul. 15, 1985, now U.S. Pat. No. 4,791,547, which is a division of U.S. patent application Ser. No. 06/473,689, filed Mar. 9, 1983, now U.S. Pat. No. 4,530,045, which is a continuation-in-part of U.S. patent application Ser. No. 06/190,036, filed Sep. 23, 1980, now U.S. Pat. No. 4,386,409. This application is also a continuation-in-part of U.S. patent application Ser. No. 07/440,502, filed Nov. 17, 1989, now U.S. Pat. No. 5,020,374.

TECHNICAL FIELD

This invention relates generally to process measurement and control systems, and particularly to one which is directed to the measurement of flow of sewage.

BACKGROUND OF THE INVENTION

There is an almost endless number of physical and chemical processes employed today wherein proper and efficient operation depends upon accurate measurement, and often implementation of controls or corrective measures are taken based on these measurements. Sewer flow is particularly a critical such measurement.

Sewer flow basically involves the determination of liquid height in a sewage flow containment and average velocity of flow (different levels may flow at different rates) in that containment. These quantities may be separately measured or one measured, particularly liquid height, and the other computed with known equations, known as Manning's equations. Liquid height measurements are typically measured via an immersed sensor or an ultrasonic distance measurement made from a reference position down to the liquid level of sewage, the latter being feature of this invention. By such techniques, liquid level can generally be quite accurately determined. However, the other quantity, average velocity of the volume of flow, has not been readily susceptible of reliable measurement, particularly over a significant period of time.

Perhaps the oldest approach, which dates back a number of years, has been to employ a sonic transducer either within the fluid or on the outside of the containment to transmit a sonic signal through the sewage and to detect signals (typically echoes from moving objects or particles in the sewage) and measuring the change in frequency which has occurred due to the velocity, or Doppler, effect on the signal. Such a system is described in U.S. Pat. No. 4,397,191. Another approach, described in U.S. Pat. No. 4,083,246, employs an electromagnetic sensor Which senses the velocity of flow immediately around the sensor.

In the Doppler case, the problem has been to somehow select from many signals the one representing the average flow for the sewage since the immediate signal information does not reliably indicate this factor. In practice, the Doppler signal is chosen by counting the number of signal zero crossings or by a phase lock loop which locks onto one signal as a chosen average velocity signal. In the case of the former, substantial velocity errors (from average velocity) arise from the fact that one has typically a number of signals which contribute to zero crossings, and it is almost happenstance that together they represent a true average, or average velocity. In the case of a phase lock loop, such a system tends to lock onto the loudest signal which, again, may or may not be representative of average velocity. In any event, signals errors will be present almost as many times as accurate signals.

In the case of a magnetic-type device, typically it must be positioned at one level in the containment and thus only it determines velocity at that level, which may or may not be representative of average flow. To correct for this, the measured velocity output signal is compensated by a factor which is a function of depth of fluid. The basic problem, however, is that with any significant sludge around the sensor, a constant hazard in the case of sewer pipes, velocity accuracy drops off quite significantly with any extended usage.

As indicated in U.S. patent application Ser. No. 440,502, and with respect to which the applicant is a co-inventor, there has been determined a new approach to Doppler signal analysis enabling extremely accurate determination of average velocity. It is accomplished by scanning or otherwise detecting the range of Doppler velocity signals present, as by a Fourier transform, and to then select as the frequency indicative of average velocity the one which is on the order of 90% of the highest frequency present. By the employment of this approach, there is enabled in the present system a particularly accurate determination of fluid flow and, as a consequence, a most accurate determination of inflow and infiltration measurements, as generally discussed in U.S. Pat. No. 4,630,474.

SUMMARY OF THE INVENTION

A sewer flow measurement system wherein flow is computed from a measured liquid height in a flow containment of a known configuration and from the average velocity of flow and wherein average velocity of flow is determined by sonically detecting the various velocities present in flow, determining the highest velocity present, and fixing average velocity at a value approximately equal to 90% of the highest velocity detected.

DESCRIPTION OF PREFERRED EMBODIMENT

Figure 1:
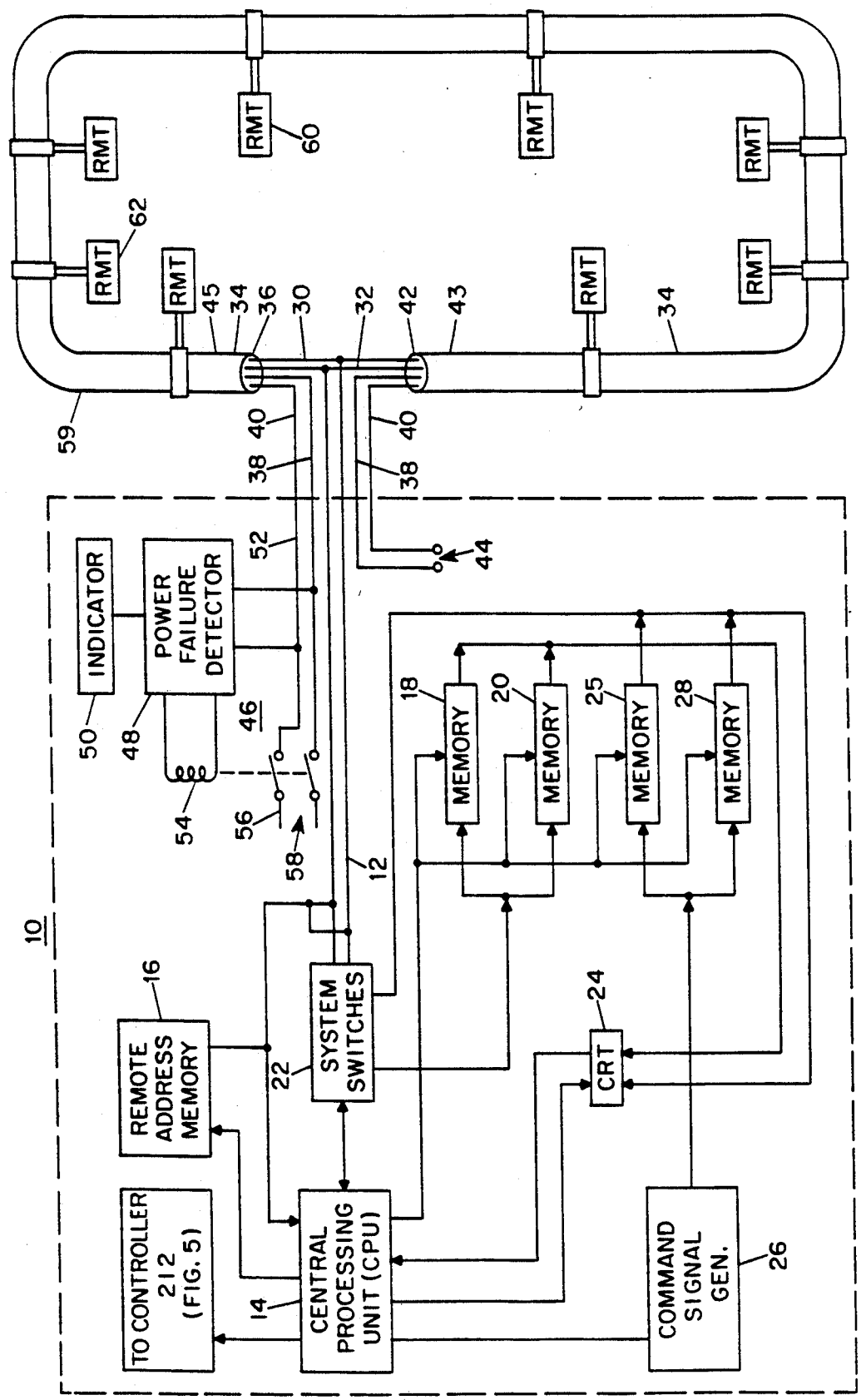
FIG. 1 is a block diagram illustrating the measurement and control system.

Referring to the drawings, and initially to FIG. a central controller 10 controls the operation of a measurement and control system sequentially communicating with each of remote data units RMT which are spaced at strategic locations to measure and/or control processes or equipment. In general, a communications channel is established between central controller 10, and each of remote data units on a multiplex or timed basis, each communications channel persisting for repeated intervals at some selected rate. For example, each of the remote data units would be polled in a fraction of a second wherein all would be polled, for example, in 1/30 of a second. Thus, each would be polled for 1/30 of a second divided by the number of remote data units. Actually, the total polling cycle would be based upon the desired or necessary length of the communications interval. To accomplish this, means are provided to supply as an output of central controller 10, on data lines 12, appropriately spaced and digitally encoded unique address signals, one for each of the remote data units RMT. This and other operations of central controller 10 are conventionally controlled by a central processing unit (CPU) 14 which, in this instance, sequentially directs the control signals to address memory 16 which then continuously, or as a request, provides as an output to data line 12 the unique address signals required to poll the remote data units, this being performed repeatedly as described.

Central controller 10 performs two basic functions, to obtain data from at least certain of the data units, and to direct signal commands to all or to selected ones of the remote data units. Both of these functions are performed during intervals between the sending out of the various address signals and thus each discrete interval or period between discrete address signals forms a discrete communications channel for this purpose, as described.

By way of illustration, memory units 18 and 20 are shown as being for storage of digital responses from remote data units RMT, eight of which are illustrated. Data is controllably routed to the data units during a discrete communications interval or channel through system switches 22 from data lines 12 controlled by CPU 14, internally, or as directed by cathode ray terminal (CRT) 24. CRT terminal 24 would be conventional having a cathode ray type display and keyboard, and where desired, a printer would be attached to the terminal, and under command of the terminal would actually print out displayed data.

As illustrative of the operation of the system in directing data to one or more of the RMT units, a command requirement would be entered in CRT 24 via its keyboard and then by conventional control of CPU unit 14 and its command signal generator 26. Command signal generator 26 provides selected output command signals in digital form, e.g., a measurement reference signal. Typically, these signals would be initially stored in a memory, illustrated here by memory units 25 and 28, and then under the control of CPU 14 and system switches 22, the outputs of these memory units would be supplied out on signal lines 12.

Signal lines 12 connect to data conductors 30 and 32 of cable 34. Signal transmission between central controller 10 and the data units RMT is accomplished under the control of CPU 14 immediately following the transmission of address from RMT address memory 16 to a particular data unit RMT to be communicated with.

CPU 14 would typically also be used to control computation circuitry (not shown) which would effect any desired manipulation, averaging, or trend showing that may be required or desired from the data appearing in memory units 18, 20, 25, or 28 under the control of its own memory or under the control of CRT 24.

One most important feature of this invention is that of the power link between the data units RMT and central controller 10 In the past, in accordance with the known present state of the art, data units (and they would differ from those of the present system) connected to a central controller have been connected by two circuits, one of these supplies operating power for the data unit, and one passes data to or from a data unit. The first of these electrical circuits would typically supply 115 volts A. C. power to a power supply in a data unit which would then develop direct current biasing for signal circuitry within the data unit. In accordance with prevailing electrical codes, the wiring for this power circuit must typically be enclosed in a separate conduit. The data circuit would then be additionally run with either a coaxial cable or some form of two-conductor communications cable. As suggested above, this is a very expensive installation, and industrial averages tend to put the price in excess of $1 million for a 60 data unit loop.

In accordance with the applicants, system, the cost of a much more reliable system can be reduced on the order of one-third.

In accordance with the applicants' invention, cable 34 is a special cable and, as illustrated, it is made up of an outer conductive cover 36 and four spaced inner conductors 30, 32, 38, and 40. Between the conductors and filing the remainder of cable 34 is a solid dielectric material 42. As described above, two of conductors 30 and 32 are connected to signal leads of central controller 10. The other two, conductors 38 and 40, are employed as A. C. power conductors.

As is noted, and as one feature of this invention, cable 34 extends in a complete loop, commencing and terminating at central controller 10. The signal lines 12 from central controller 10 are directly connected to both ends, or unbroken conductors 30 and 32, and thus there is a redundancy of paths available to data units; and in the event of a break in the cable at some point, as between two of the data units, there would be maintained a signal path to all of them.

In order to supply power to both sections of cable 34, should it be broken, and to detect the occurrence of such a break, the applicants have provided a failure correction system. In accordance with it, power is directly fed to one end 43 of cable 34 as by power line connection 44. Then, power is fed to the other end 45 of cable 34 through a relay switch 46, which functions as a portion of power failure detector 48, which has a signal indicator 50. Power failure detector 48 is connected to conductors 38 and 40 of end 45 of cable 34, and it supplies line voltage to coil 54 of relay 46, relay 46 being a normally closed relay having switch contacts 56 that, when line 52 is powered, are opened, and when line 52 is unpowered, contacts 56 close. One such failure detector might comprise a set of normally open auxiliary contacts operated by coil 54 which would then be closed, supplying power to coil 54 when there was power on line 52; and upon the disappearance of power, coil 54 would deenergize, and the auxiliary contacts would open. Then, because coil 54 would be deenergized, contacts 56 would close to provide power from power terminal 58 to line 52. Coil 54 would not be reenergized by virtue of there again appearing power on line 52 until the auxiliary contacts were reset by manually closing them.

Each data unit loop 59 is basically the same. However, there are certain differences, and to illustrate this, two are shown, data unit 60 in FIG. 2 and data unit 62 in FIG. 3. Like circuitry elements are designated by like numerals.

Figure 2:
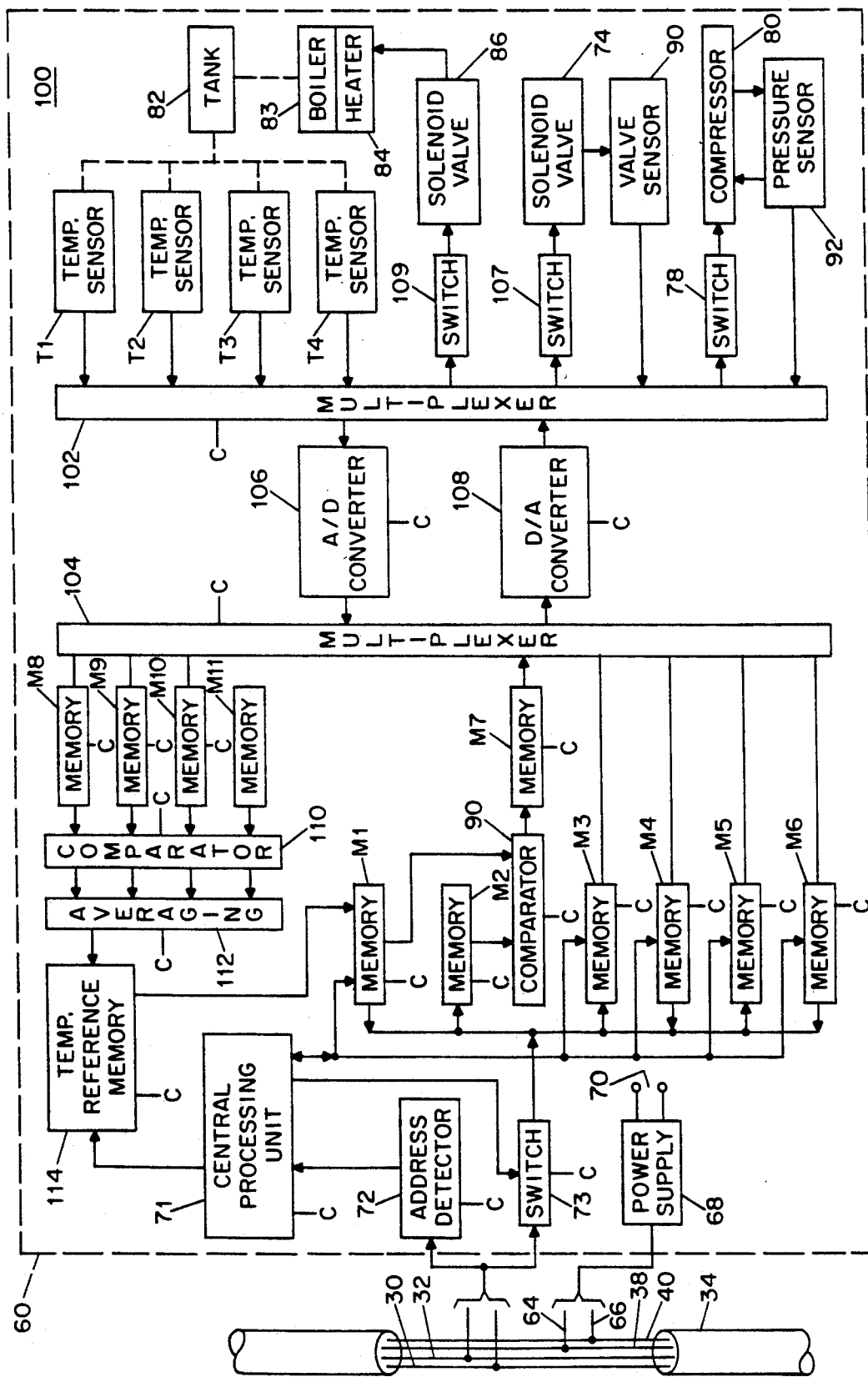
FIG. 2 is a block diagram illustrating the measurement and control system as applied to a waste management system.

Referring first to FIG. 2 and data unit RMT 60, power input leads 64 and 66 are connected to cable 34 providing 115 volts A. C. power to power supply 68. It is a conventional A. C. to D. C. power supply which provides low D. C. biasing voltages on terminals 70 to the other circuitry elements as shown in FIG. 2. Data unit 60 includes its own conventional central processing unit (CPU) 71 which is instructed to perform a sequence of actions conditioned upon there appearing on signal input leads connected to conductors 30 and 32 of cable 34 an address signal corresponding to a unique address assigned to data unit 60. The occurrence of this address is detected by address detector 72 which then causes CPU 71 to commence operation. It is the role of CPU 71 to enable bi-directional communications between central controller 10 and data unit 60 during the period between the detection of the address for data unit 60 and the occurrence on signal conductors 30 and 32 of the address for the next data unit to be polled. Thus, address detector 72 would provide essentially a turn-on signal with the occurrence of the correct address for data unit 60 and turn-off on the occurrence of a distinct different address signal. It then signals CPU 71 to operate switch 73 to enable signal flow to or from data unit 60. The signals are temporarily recorded in memory illustrated by discrete memory units M1–M6. Of these, memory units M2, M3, and M5 are illustrated as memory storage locations for receiving and storing certain commands from central controller 10. As an example, memory unit M3 receives and stores a value representative of a desired on or off state for which 73 which operates solenoid valve 74 open or closed. Memory unit M5 is illustrated as a memory storage location for a digital signal received from central controller 10 representative of the desired on or off state for switch 78 which operates to turn a compressor 80 on or off.

Memory unit M2 is illustrative of a memory location in which is stored a temperature command signal value received from central controller 10 and which is employed as a temperature setting for tank 82 heated by heater 84 from boiler 83, as will be further explained. Heater 84 is an oil-fired heater controlled by solenoid valve 86 and is operated on when a measured temperature signal supplied to memory unit M1, which is indicative of the temperature of tank 82, falls below the temperature stored in memory unit M2. The development of the measured temperature value signal and the application of it to memory unit M1 will be described below. The developed signal is available for sending to central controller 10 and for local control purposes.

The temperature control function is effected by feeding the digital signal values in memory units M1 and M2 to comparator 90, and then comparator 90 provides a digital output to memory unit M7 which is employed, as will be described, to provide an operating signal value for ultimately operating on and off solenoid valve 86, which controls the flow of heating oil to heater 84.

Memory units M4 and M6, along with memory unit M1, are employed to store other data originated by data unit 60. As an illustration, memory unit M4 would store a signal from valve sensor 90 representative of the state, on or off, of solenoid valve 74, and memory unit M6 would store a value detected by pressure sensor 92 indicative of the on or off operating state of compressor 80.

As stated above, memory unit M1 stores a temperature value of the temperature in tank 82. This value is uniquely determined from four temperature sensors T1–T4, each discretely measuring the temperature in tank 82 of an anaerobic digester 96, schematically illustrated in FIG. 4 but physically located adjacent to data unit 60.

The transfer of data between sensors T1–T4 and other of interface elements 100 and memory units M1–M6 is effected by multiplexers 102 and 104, A-D converter 106, and D-A converter 108. These converters appropriately operate to effect or be responsive to analog signals at terminals of interface elements 100 and digital signals at the memory units. Multiplexer 102 functions as a parallel-to-serial converter, sequentially feeding A-D converter 106 analog outputs of temperature sensors T1–T4, analog signal state output of valve sensor 90, and analog state sensor output of pressure sensor 92. Then, A-D converter 106 converts these signal outputs to digital form and supplies them in a serial manner to multiplexer 104 which converts digital signals to parallel outputs and supplies them to the indicated memory units M4, M6, and M8–M11. Conversely, multiplexer 104 receives digital signals from memory units M7, M3, and M5, converting them from parallel-to-serial form and supplying them to the input of D-A converter 108. D-A converter 108 then applies these signals, after conversion, to multiplexer 102, which functions in a reverse mode to convert the signals from serial to parallel form at outputs which are connected to switch 108, opening solenoid valve 86, switch 107 operating solenoid valve 74, and switch 78 operating compressor 80, respectively, as shown.

The control of these operations, as well as all other operations of data unit 60, is controlled by CPU 71 and a control connection to all elements as indicated by the general designation of a connection between CPU 71 and elements of the system marked with the symbol C. Typically, the polling of the interface units 100 by multiplexer 102 (in connection with A-D converter 106, D-A converter 108, and multiplexer 104) is achieved at a faster rate than the polling by central controller 10 of data unit 60, and thus updated information appears in the memory units on a sufficiently updated basis.

Figure 4:
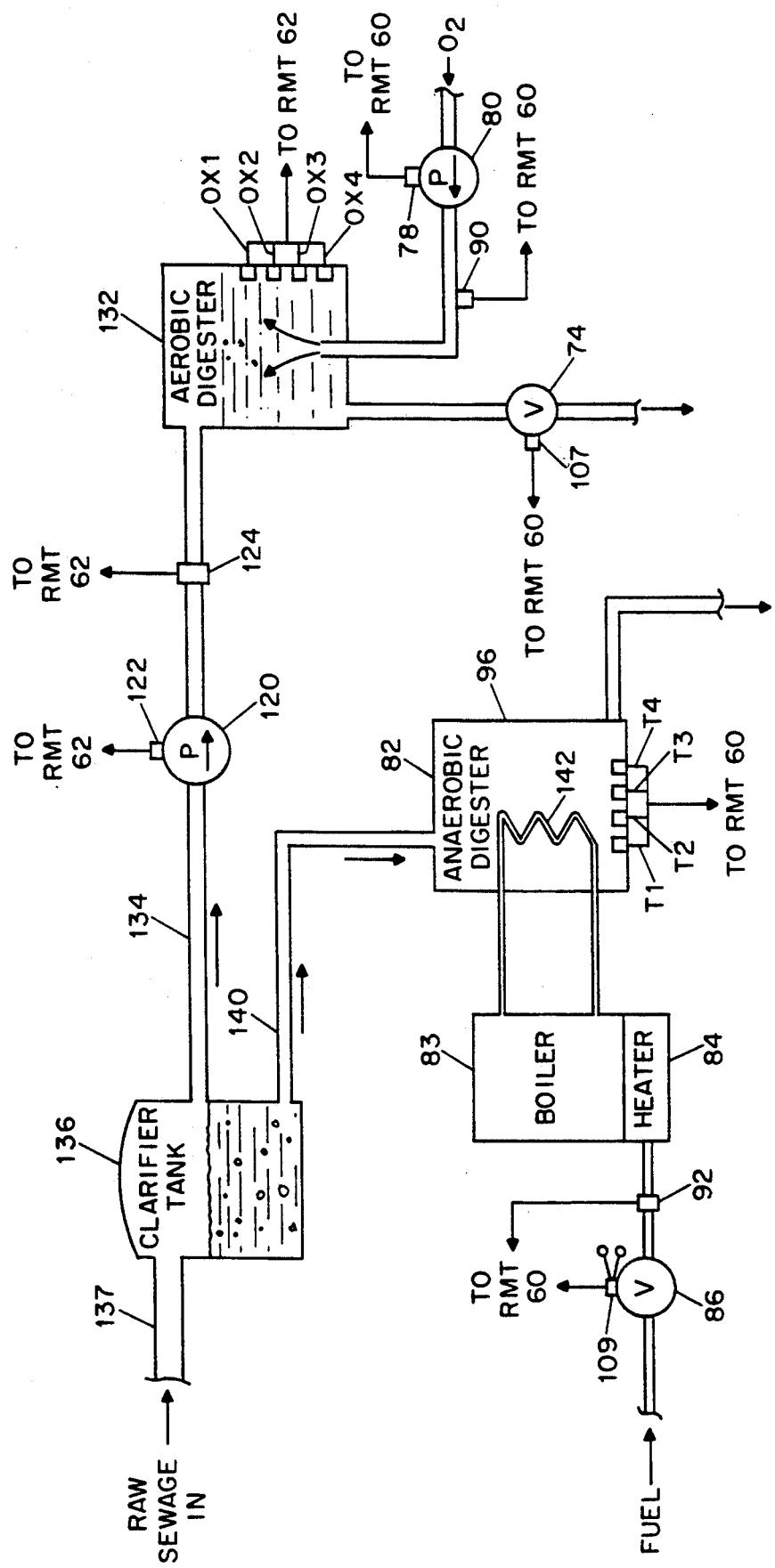
FIG. 4 is a block diagram illustrating the various components of a waste management system incorporating portions of the measurement and control system.

To examine in greater detail the operation of the temperature sensors T1–T4, it is to be noted that, as shown in FIG. 4, they are all four coupled to an anaerobic digester tank 82. The outputs, analog, of all of the sensors should be basically the same. The four outputs are converted to digital form as described by A-D converter 106 and each signal output provided one of memory units M8–M11. They are then fed upon command from central processor unit 71 to a digital comparator 110 which compares each with the other, and in the event that one or even two signals depart significantly from the other signals, these signal values are thrown out. The remaining "good" digital signal values are then supplied to averager 112, which provides a digital value representative of the average of the "good" analog signals from sensors T1–T4. In order to translate this signal to an actual indication of temperature, the average value signal is supplied to temperature reference memory 114, which then provides as an input to memory unit M1 a temperature in Fahrenheit or centigrade in terms of the calibration of a sensor of the type of sensors T1-T4. Memory unit M1 applies this value as one input to comparator 90 as described above. The output of reference temperature value stored in memory unit M2 is also supplied to comparator 90 to effect the heat control function as described above.

In addition, the signal in memory M1 is polled together with the content of memory units M4 and M6 of data unit 60, and their contents are thus supplied to central controller 10 in the manner previously described.

Figure 3:
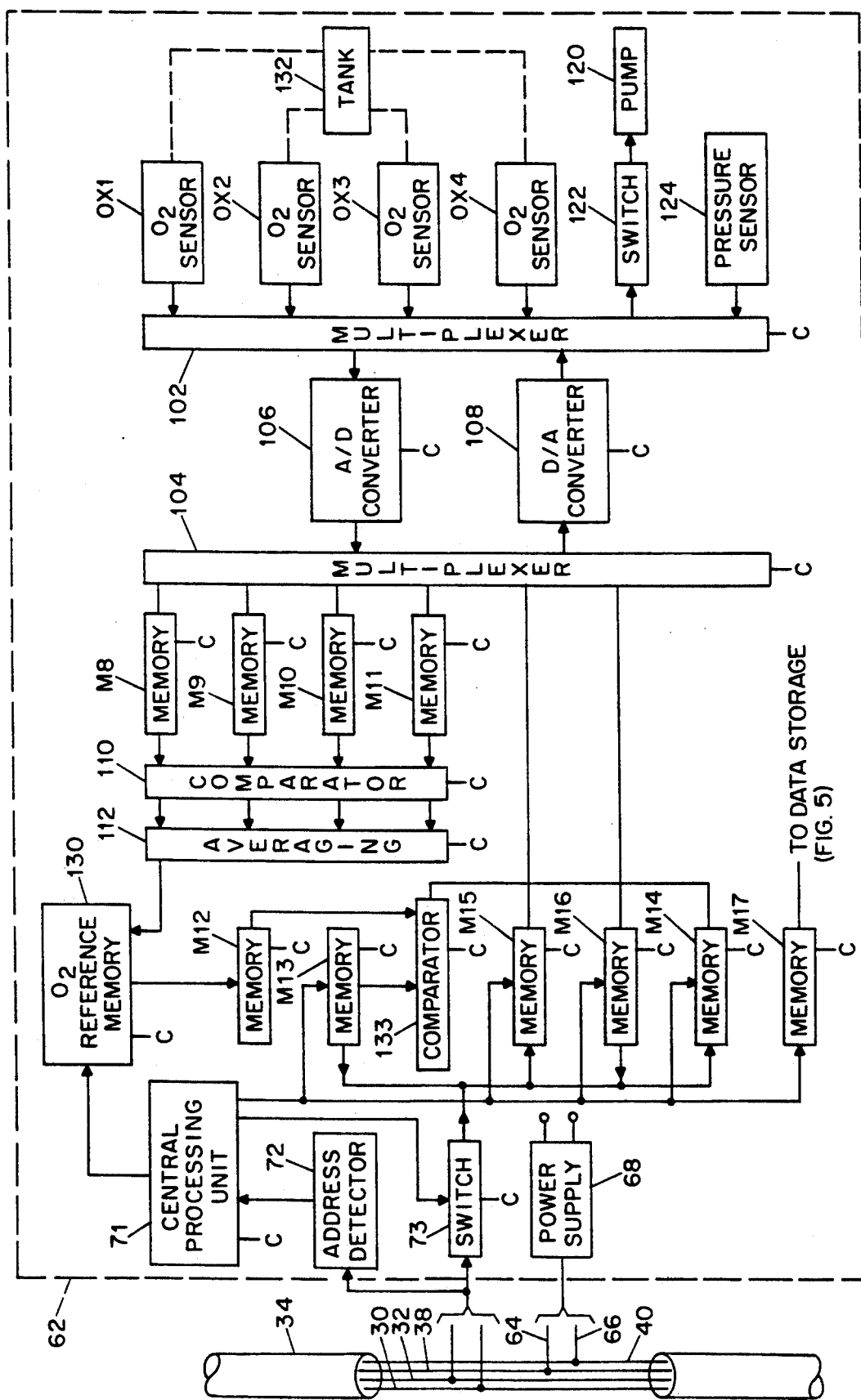
FIG. 3 is a block diagram illustrating another portion of the measurement and control system as applied to a waste management system.

FIG. 3 illustrates a second data unit, data unit 62, wherein the same general function and arrangement of components is employed as in data unit 60, and wherein like components bear the same reference numeral. The illustrated makeup differs to the extent that the active usage of this data unit differs as shown. For example, instead of the measurement of temperature, the dissolved oxygen, $O_2$, is sensed by sensors OX1-OX4, and instead of a valve and compressor being operated and operations sensed, the operation of pump 120 is operated on and off by switch 122 and its operating state monitored by pressure sensor 124. The digitally converted values of analog outputs of oxygen $O_2$ sensors OX1-OX4 are initially stored in memory units M8-M11, cross compared in comparator 110, and the digital values of these memory units which are within a selected percentage of each other are averaged in averager 112. The average value output of averager 112 is applied to $O_2$ reference memory 130 where this value is employed essentially as an address for a percent $O_2$ value of reference memory 130, which, in terms of the calibration of output voltage from $O_2$ sensors OX1-OX4, provides as an output a percent $O_2$ value as a digital figure. It is thus provided under the control of central processing unit 71 to memory unit M12.

As an illustration, and simultaneously referring to FIG. 4, oxygen sensors OX1-OX4 are coupled to tank 132 of sewage processor 134, tank 132 being located adjacent to data unit 62. Similarly, pump 120 is coupled in a line 134 between clarifier tank 136 and tank 132. Likewise, pressure sensor 124 is shown as coupled to line 134 at the output of pump 120 to detect the pressure output from pump 120.

Memory unit M13 of data unit 62 (FIG. 3) receives and stores a digital signal representative of an ideal state for the dissolved oxygen level in tank 132, this being received as a directive signal from central controller 10. The "actual" dissolved oxygen signal from memory unit M12 and a reference value from memory unit M13 are supplied to comparator 133, and it provides a digital signal to memory M14 indicative of whether the oxygen level in tank 132 should be increased. If such is indicated, then this signal employs a turn-on signal for compressor 80, the turn on of which is directed through data unit 60. This is effected when data unit 62 is polled by central controller 10, the compressor control signal being supplied back to one of memory units 18 or 20 of central controller 10. Then, when data unit 60 is polled, the compressor control signal is supplied to memory unit M5 of data unit 60 from which may operate switch 78 on and thereby compressor 80.

Memory unit M15 of data unit 62 receives from central controller 10 a pump command signal for the operation of switch 122 and thereby pump 120, this, of course, occurring when data unit 62 is polled. The signal comes from one of memory units 25 or 28 which have received command signals from command signal generator 26.

Operation of the system will be discussed in relation to the sewage processing system illustrated in FIG. 4. Raw sewage is initially supplied into a clarifier tank 136 via line 136 to which some solids settle out and flow through a pipe 140 to an anaerobic digester tank 82. Anaerobic digester tank 82 is heated by means of heated water flowing through coil 142 from boiler 83. Boiler 83 is heated by an oil-fired heater 84, with fuel being supplied to it through a solenoid valve 86. In order to maintain a selected temperature in tank 82, and as discussed, a plurality of temperature sensors T1-T4 are coupled to the tank, and each provides an analog output signal to multiplexer 102 (FIG. 2) of data unit 60, tank 82 being located close to data unit 60. The temperature signals are processed as described above, and a temperature signal representative of the average temperature of the sensors is provided to memory unit M1, and it in turn provides this value to comparator 90. Comparator 90 also receives a temperature signal from memory unit M2 transmitted to data unit 60 from central controller 10 representative of a desired temperature. Comparator 90 then provides a signal output when the temperature in tank 82 falls below the selected temperature and provides a turn-on signal through multiplexer 104 and D-A converter 108 to switch 109 to operate solenoid valve 86 to turn on fuel flow to boiler 82 and thus effect heating of anaerobic digester tank 82. When the temperature reaches the selected value level, comparator 90 (FIG. 2) provides an off signal value wherein solenoid valve 86 shuts down heater 84.

A second fluid output from clarifier 136, at a higher level, flows outward through line 134, being pumped by pump 120 when turned on to pump the liquid contents of tank 136 to an aerobic processing tank 132. Pump 120 is operated on command from central controller 10 by sending to data unit 62 a directive signal which is stored in memory unit M15 and then supplied while in the directive operation of data unit 62 to switch 122 which turns on pump 120. Pressure sensor 124 senses pressure in the outlet side of pump 120 (from line 134) and provides a status signal back to memory unit M16, which is then transmitted to central controller 10 on demand.

Oxygen is pumped into aerobic tank 132 by compressor 80, compressor 80 being operated on responsive to the sensed dissolved oxygen content of the liquid in tank 132 which is sensed by redundant $O_2$ sensors OX1-OX4. In operation, compressor 80 is controlled via the circuitry shown in FIGS. 2 and 3 as discussed above and wherein comparator 133 receives an average $O_2$ value from $O_2$ reference memory 130 and a desired $O_2$ value from memory unit M13. The output of comparator 133 as a compressor control signal indicates where there is a deficiency of oxygen and thereby a "compressor on" signal is supplied to memory unit M14. Central controller 10, in polling data unit 62, transfers this command signal in memory unit M14 to one of the memory storage units, e.g., memory unit 18 or 20, in central controller 10. Thereafter, when data unit 62 is polled, this signal is passed on to data unit 60, and wherein the signal is stored in memory unit M5 and employed to operate switch 78 and thereby compressor 80 as indicated.

Memory unit M15 of data unit 62 receives a command from central controller 10 as a pump control signal for the operation of switch 122 and thereby pump 120, this, of course, occurring when data unit 62 is polled. It would have been stored in typically one of memory units 25 or 28 in controller 10 which have received control signals from command signal general 26.

Memory unit M16 of data unit 62 receives from pressure sensor 124 a value indicated when pump 120 is on, and its output is read back to one of memory units 18 or 20 of central controller 10 when data unit 62 is polled. Typically, this and other information would be displayed or indicated as desired by central controller 10.

Figure 5:
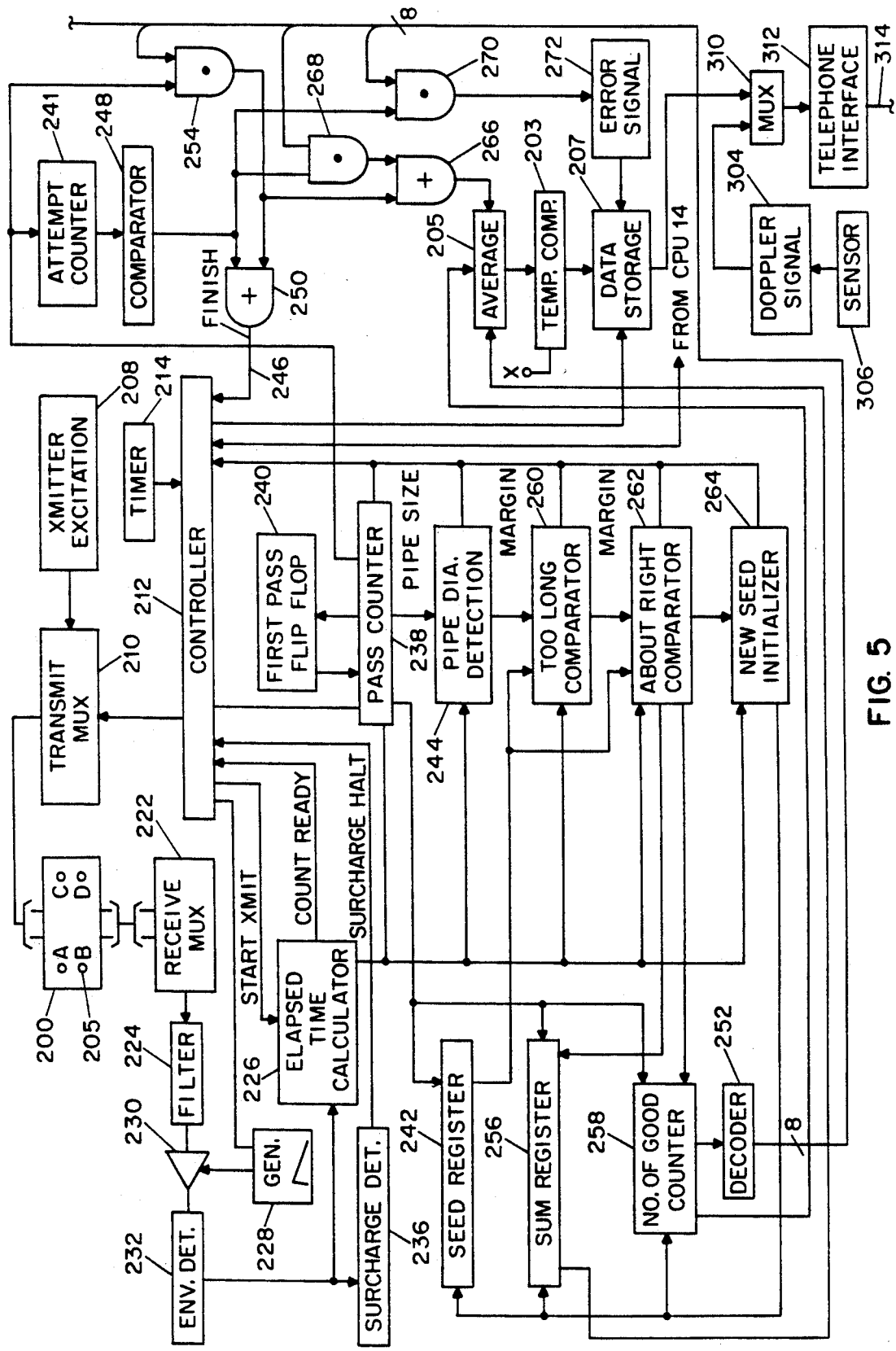
FIG. 5 is a schematic block diagram of the system.
Figure 6:
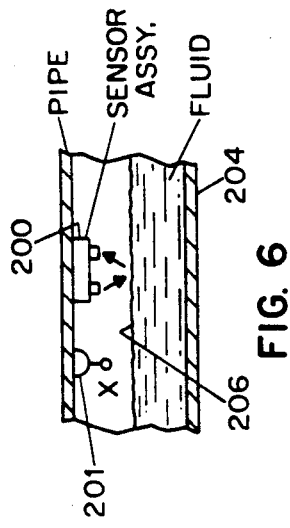
FIG. 6 is a schematic illustration of the position and ultrasonic transducers and a temperature sensor in a pipe to be monitored.

In addition to the translation of the outputs of several transducers directly to digital information before any processing of signals, FIGS. 5 and 6 illustrate the system where the outputs are significantly processed before being digitized. In this portion of the system, liquid height within a pipe is measured, as particularly shown in FIG. 6. Here, a transducer assembly 200 consists of four conventional ultrasonic transducers, each being capable of either emitting acoustic signals responsive to an electrical input to that signal or responsive to the receipt of an acoustic signal to provide an electrical output representative of the received signal. As shown in FIG. 6, the transducer assembly is mounted on the roof of a sewer pipe 204 and is separated by a layer or layers of acoustic insulation 205 (FIG. 5) to produce attenuation of direct signal transmission as between them by a factor of at least 10. The transducer assembly is thus positioned to direct a signal downward against liquid surface 206, from which the signal would then be returned as an echo to transducer assembly 200. Transducer assembly 200 is positioned back in pipe 204 a distance equal to at least the diameter of pipe 204 from the exit end of the pipe.

Temperature sensor 201 is also positioned in pipe 204, and it provides a signal through common terminal X to temperature compensator 203, a multiplier which multiplies averaged elapsed time signals by a factor which corrects for the known variation in sound velocity in air with a change in temperature. This factor is equal to $331.5 + 0.605(T° C.)/-331-5$, where T° C. is the pipe air temperature in degrees centigrade. Temperature compensator 203 receives averaged samples from average unit 205, compensates them for temperature, and provides them to storage unit 207, as will be further explained.

Transmitter exitation device 208, typically an electrical oscillator, provides an electrical output signal of, for example, 40 kHz This signal is fed to a transmit multiplexer (MUX) 210 which, responsive to a control signal from controller 212 identifying a particular one of transducers A, B, C, and D of transducer assembly 200, supplies the exitation signal individually to the transducers in a selected sequence. Each signal is timed by controller 212 to provide a burst signal of a selected length, e.g., 0.012 to 0.5 millisecond, and each containing 1 to 20 cycles of a 40 kHz signal. The operation of controller 212 is initiated on periodically by timer 214 to commence each sequence of operation, for example, each 15 minutes.

Controller 212 is a logic device, such as exemplified by Texas Instruments Microcontroller No. SPBO400, it being connected in circuit in a conventional manner in accordance with the functions for it as hereinafter described. Basically, it is a rather simple logic unit which is operated on, senses a condition to see whether it is to proceed, then proceeds to sequentially operate multipliers; and then, depending upon signal information provided it, it repeats certain operations until instructed to halt.

In addition to directing transmit multiplexer 210, sequentially as described, controller 212 coordinately directs receive multiplexer 222 to couple outputs of discrete transducers to signal receive circuitry, the first element of which is band pass filter 224. Band pass filter 224 is configured to pass the transmit frequency burst to generally attenuate signals higher or lower than this frequency.

Simultaneously with the transmit pulse, controller 212 provides a timing reference pulse to elapsed time calculator 226 and also provides an initiation pulse to ramp generator 228, which then generates a ramp signal (shown) which is provided to a summing device 230, and wherein the output of filter 224 and generator 228 are subtractively combined to provide a signal to envelope detector 232. Observing the waveform of the ramp signal, it will be noted that the effect of this combination is to provide an initial decrease in responsiveness of the circuit, followed by an increase in responsiveness with time following a transmitted pulse. This enables a relatively strong and short range echo signal to be detected without affecting the ability of the circuit to process long range and weaker signals. Without this provided effect, signal levels in the receive circuitry from the transmit signals and received short range signals, occurring very closely together, tend to block effective signal detection. This, in turn, prevents effective short range measurements. By virtue of the variable responsiveness, liquid level samples can be obtained to within approximately 0.5 inch from the transducer, thus making it feasible to provide in-pipe liquid level detection.

Envelope detector 232 simply demodulates the output of summing device 230 to provide a signal envelope of the transmitted signal. It has been found that this envelope has a rather gradual rise to peak and then falls off to essentially zero at approximately the same slope. Envelope detector 232 includes a peak detector, and its detected peak signal is fed to elapsed time calculator 226, which is a timer which is turned on by the initial timing pulse from controller 212 coincident with a transmitted pulse and turned off by the detection of a high point on envelope detector 232. Knowing the length of the transmitted pulse and time position of its peak, like time points on transmitted and echo pulses can be determined, and thus precise signal transmit times determined. Elapsed time calculator 226 is present to indicate one-half of the length of elapsed time; and since the speed of sound in the air is a constant (subject to compensation for temperature as described above), the output of calculator 226 is representative of the distance from a transducer to surface 206. The distance from the top of pipe 204 to the active area of the transducers is constant and compensated for by a like reduction in value D of the diameter of pipe 204.

Liquid level data is significant in the determination of flow only so long as the pipe from which flow is being measured is not full. Of course, when the pipe becomes full, there can no longer be a liquid level variable. Thus, it is necessary to determine when the pipe fills; and in accordance with this invention, the full or surcharge state is detected by surcharge detector 236, which monitors the amplitude of the echo signals as received from envelope detector 232.

It has been observed that when the transducers are fully immersed in liquid, there is a fairly significant increase in signal strength from a received signal, and thus surcharge detector 236 is a signal amplitude detector, adapted to provide an output to controller 212 whenever a surcharge condition exists. Responsive to this output, controller 212 is adapted to cease taking samples or not to take samples until the surcharge condition recedes.

To consider operation of the system, assume that controller 212 is programmed to cause sequential operation of transducer A and transducer B as a first transmit-receive pair, transducer C and transducer D as a second transmit-receive pair, transducer A and transducer C as a third transmit-receive pair, and transducer B and transducer D as a fourth transmit-receive pair. Thus, when triggered on by timer 214, controller 212 directs the turn-on of each of these pairs in the indicated sequence, which sequence is repeated until the program of data being dictated by controller 212 is completed.

Assume now that controller 212 has been turned on, and thus controller 212 signals multiplexer 210 to pass a first signal burst from transmitter exitation device 208 to transducer A. The signal burst is then radiated in the form of sonic energy down through the air in pipe 24. Simultaneously, with the initiation of this pulse of energy, controller 212 triggers on elapsed time calculator 226 to turn its counter on, which commences counting time. As described above, elapsed time calculator 226 provides an output representative of one-half the elapsed time between the transmission and receipt of an echo in order to provide a direct indication of a one-way travel signal. Simultaneous with the described operation of multiplexer 210, controller 212 operates multiplexer 222 to cause transducer B to operate as a receive transducer by coupling it to filter 224. Controller 212 also operates on pass counter 238, which is adapted to receive the output time sample of elapsed time calculator 226.

Pass counter 238 is a digital register having these features. It provides an enable input to AND gate 254, a control incrementing input to attempt counter 241, and a control input to "first pass" flip-flop 240 each time it is operated on by controller 212. It has a logic input responsive to a "1" output from first pass flip-flop 204, causing pass counter 238 to pass its registered value, received from elapsed time calculator 226, to seed register 242 and to sum register 256. Also responsive to the "1" output from flip-flop 240, pass counter 238 provides an incrementing signal to "number of good" counter 258.

In the event that first pass counter 238 receives a "0" output from first pass flip-flop 204, which indicates that pass counter 238 is not being operated subsequent to a first time, pass counter 238 provides an operating input signal to pipe diameter detector 244.

Pass counter 238 includes logic elements necessary to perform the foregoing functions, which logic elements clearly are selectable from the recital of these functions.

Before proceeding with any further operation, controller 212 tests finish line 246 to determine if operation should be halted by virtue of the finish of a sequence of measurements, this being indicated by one of two criteria employed by the system. The first one is that there has occurred 50 transmissions wherein there may have been less than eight, or even zero, good samples; and the second one is that there has been obtained eight good samples, as will be further described. A finish condition is indicated by a "1" on finish line 246.

Generation of a signal on finish line 246 is determined alternately as follows. In one instance, a "51" count from attempt counter 241 is compared in comparator 248 with a 51 count, and it provides a "1" output to OR gate 250 and thus to finish line 246. Otherwise, it provides a "0" output to finish line 246. In accordance with the second criteria, coincidence between a signal indicating eight good samples from decoder 252 is provided to AND gate 254 together with a count signal from pass counter 238. This causes a "1" output of AND gate 254 to be provided to OR gate 250, which provides a "1" to finish line 246. Otherwise, this last described circuitry provides a "0" to finish line 246.

As only one attempt thus far has been made, we must assume that the output on finish line 246 is a "0," indicating that neither of the two finish conditions has been reached. Thus, to continue, the output of elapsed time calculator 226, providing a first elasped time sample, is fed to pass counter 238. Responsively, pass counter 238 provides an incrementing count to attempt counter 241 to operate it to a "1" count, and it checks to see if this was the first sample taken, as described above. Pass counter 238 will be informed in this respect by virtue of it providing a counter output to first pass flip-flop 240, which in turn provides its output back to pass counter 238. Assuming a first trigger situation in flip-flop 240, as described, its output to pass counter 238 is set to a "1." Accordingly, and in such case, pass counter 28 does these four things. First, it resets the flip-flop to a "0"; second, it loads the elapsed time from time calculator 226 into seed register 242 and also supplies this value to sum register 256; third, the "number of good" counter 258 is incremented; and finally, pass counter 238 indicates to controller 212 the completion of this pass, enabling controller 212 to proceed to order a second sample to be taken. If the output of flip-flop 240 had been "0," it would have activated pipe diameter detector 244. Since, as described, this was only the first attempt of a sample being taken, this latter condition would not be indicated.

Seed register 242 is simply a digital register which holds one sample until it is supplied to a second one, and the second one replaces the first one. Sum register 256 is also a simple digital register adapted to register the sum of inputs provided it. In other words, it is simply a digital adder. "Number of good" counter 258 is simply a digital counter triggerable from either pass counter 238 or new seed initializer 264 and which holds a count equal to the number of good samples taken, as will be further explained. Decoder 252 decodes counter 258 and has three output lines, one of which provides a "true" output when the count or output is equal to a "0." The second output becomes "true" when the count is in the range of 1–7. The third output becomes "true" when a count of 8 is registered.

To continue the description of operation, controller 212 now operates transmit multiplexer 210 a second time to provide exitation of transducer C and to trigger on, again, elapsed time calculator 226 and to operate receive multiplexer 222, which in turn enables a returning echo to be received by transducer D and supplied to filter 24. Pass counter 238 is operated as described above, and it increments attempt counter 241 to a count of 2. At this time, it is clear that first pass flip-flop 240 would indicate to pass counter 238 a "0," thus the sample provided to pass counter 238 from elapsed time calculator 226 is not provided to seed register 242; and instead, by virtue of the "0" output of flip-flop 240, pass counter 238 operates on pipe diameter detector 244. Pipe diameter detector 244 is also fed a reference input representative of the diameter of pipe 240 (less, where significant, the depth of a transducer below the top of the pipe) in terms of signal transmit time.

Upon being operated on, pipe diameter detector 244 accepts an elapsed time sample from elapsed time calculator 226, which thus is the second sample taken thus far in the process, and detector 244 compares this second sample value with the reference diameter input. If the elapsed time representative of distance is greater than the reference input, it is clear that a bad sample has been received as, of course, transmit time should never exceed that represented by the pipe diameter. In the event of excessive time signals, pipe diameter detector 244 sends a signal to controller 212 to prevent further processing this signal by simply indicating to controller 212 that it take a new sample. Detector 244 is simply a difference circuit which is enabled by a control input.

In the event that the second sample is within the limits of the diameter of pipe 204, pipe diameter detector 244 triggers on "too long" comparator 260, which then accepts the first sample which is in seed register 242 and a second sample which is in elapsed time calculator 226 and subtracts the latter from the former. A plus margin allowance for this difference is provided as an input to too long comparator 260, for example +1.0 inch. The difference signal and margin signals are subtracted; and if the difference exceeds the margin signal, the sample is rejected as too large and rejected as a bad sample, in which case comparator 260 signals controller 212 to take a new sample. As indicated by the description of functions, comparator 260 simply comprises two serially arranged difference circuits operated by an enable input and two logic outputs which function as described.

If the second sample in elapsed time calculator 226 is within the criteria of too long comparator 260, and thus possibly a good sample, comparator 260 triggers "about right" comparator 262, and this comparator compares the second sample from elapsed time calculator 226 with the first sample from seed register 242 by subtracting the two and then compares the difference with a minus margin input, for example, −1.0 inch, to determine whether the sample is significantly smaller than the first sample. If the margin is not exceeded, the second sample is deemed "about right." In such case, an output of about right comparator 262 triggers on sum register 256, and the second sample is added to sum register 256, and thus there is provided a sum of the two good samples taken thus far. Second, about right comparator 262 increments, by 1, number of good counter 258, which then advances to a count of 2. Third, comparator 262 signals controller 212 to take a new sample. Comparator 262 includes, as does comparator 260, two serially arranged difference circuits, logic outputs to sum register 256, and number of good counter 258 to signal a good signal and a logic output to controller 212 to signal it to take a new sample upon the occurrence of a "good" sample.

If, however, the second sample is smaller than the first sample by more than the selected margin, about right comparator 262 supplies the second sample to new seed initializer 264, which then couples the second sample from elapsed time calculator 226 as a new sample value to seed register 242 and to sum register 256, and this transfer is sensed by number of good counter 258, which is reset by this action. New seed initializer 264 then signals controller 212 to take a new sample.

The reason for action by new seed initializer 264 is that such a series of steps described indicates that the first sample taken is significantly larger than the last one, indicating that the first one was probably responsive to a multiple path echo and thus a bad sample. By the process described, it was aborted.

The process of taking samples described will continue with repeated samples being taken consecutively by the transmitter-receiver pairs referred to above. In each instance, attempt counter 142 is incremented one step. If a good sample is determined, it is added to the sum of sum register 256 and number of good counter 258 incremented so that it carries it in the number of samples totaled in sum register 256.

In the event that about right comparator 262 indicates that a subsequent sample is significantly less than the sample in seed register 242, the new or subsequent sample is supplied to seed register 242, the value in sum register 256 is replaced by a single new sample value, and number of good counter 258 is reset by 1 by new seed initializer 264, as described.

By this process, samples will continue to be taken until one of two things occurs. Either eight good samples are summed in sum register 256, and this is indicated by the number of good samples in counter 258; or, attempt counter 241 is operated 50 times, during which time there may have been either less than eight good samples or no good samples.

If eight good samples have occurred, this is indicated by number of good counter 258. This indication is decoded by decoder 252, which provides a responsive "true" input to AND gate 254. Accordingly, with the next sample taken, the attempt incrementing output of pass counter 238 is supplied to AND gate 254, and its output would become "true" and fed through OR gate 250 to finish line 246, thus indicating to controller 212 that the data taking program was completed. If eight good samples are not taken up to the time when attempt counter 241 is incremented the fifty-first time, its 51 count output is provided to comparator 248, a digital comparator, wherein it is compared with a fifty-first count provided as a reference input. This causes comparator 458 to provide a "true" or "1" output to OR gate 250, which then provides a "true" or "1" signal to controller 212 on finish line 246, signaling the completion of a sample taking program.

Assume next that eight good samples have been taken as indicated by decoder 252. On the next attempt count, and a signal from pass counter 238 to AND gate 254, there will be provided a "true" input to OR gate 266, which then triggers average unit 205 to cause the output of sum register 256 to be divided by the number of good counts, in this case, eight. This average sample will be fed by average unit 205 through temperature compensator 203 to data storage unit 207, a digital memory, where it will be stored. A temperature compensator 203 multiplies the average sample value by a temperature compensation factor, as described above, which further enhances the accuracy of measurements.

If there had not been eight good samples taken but a lesser number (1-7), decoder 252 would provide a "true" output, indicating this to AND gate 268. A second input to AND gate 268 is provided from compare circuit 248 when there have been 51 sample taking attempts signaled by attempt counter 242 to comparator circuit 248. With these two "true" inputs to AND gate 268, the output of AND gate 268 will become "true" and this signal fed to OR gate 266, which would, again, trigger average unit 205 to cause the output of sum register 256 to be divided by the number of good counts from counter 258 and the results provided through temperature compensator 203 to data storage unit 207.

Assume now that by the end of 50 attempts there were simply no good samples obtained, and thus there would be a "0" count in number of good counter 258. This output is decoded by decoder 252 and provided as a "true" input to AND gate 270. Then, with the next attempt at taking a sample and a count input being applied to attempt counter 241, comparator 248 provides a "true" output which is supplied to a second input of AND gate 270, and which then causes AND gate 270 to become "true" and provide a signal to error signal generator 272, and it provides an arbitrary signal value to data storage unit 207 of a character which would ultimately signal to M17 (FIG. 3).

Typically, timer 214 would have initiated controller 212 to take liquid level samples each 15 minutes or so, and thus there would be stored in data storage unit or memory 207 the average liquid level value for each of the transducers for each of these timed periods, identified by a real time signal obtained, for example, from controller 212 and stored with each average liquid level value, or only with the first of a sequence of average liquid level samples which are taken at a fixed rate (e.g., every 15 minutes). This data, being typically stored at a measurement side, is made available to memory unit M17 of data unit 62 shown in FIG. 3. In addition to the taking of samples being determined by timer 214, CPU 14 (FIG. 3) is adapted to operate on controller 212 in a like fashion to that effected by timer 214. Such would be a conventional communications function for such a combination.

Figure 7:
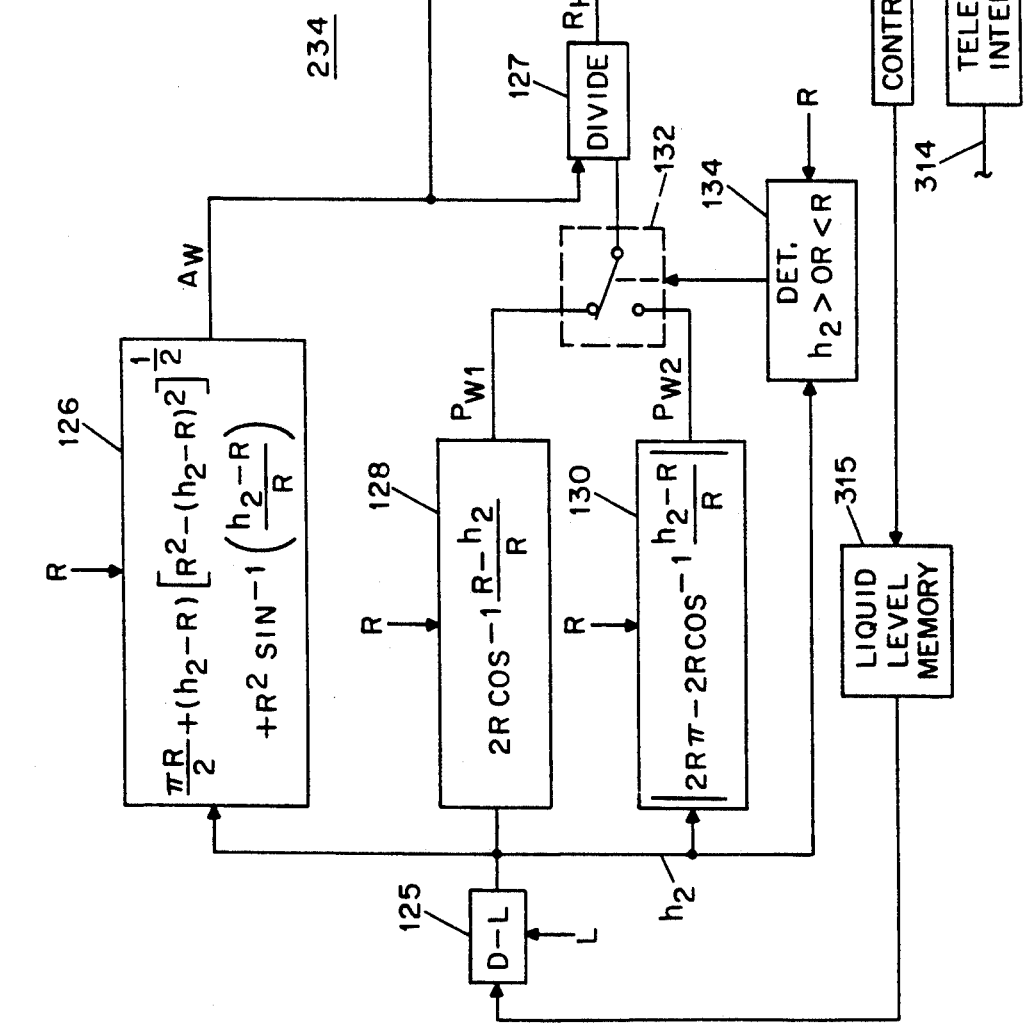
FIG. 7 is an electrical block diagram of a flow computer.

Controller 305 (FIG. 7) at a central computing site would cause the transfer of liquid height data in data storage unit 207 (FIG. 5) through a multiplexer 310 and telephone interface 312 to liquid level memory 315 (FIG. 7).

Flow computer 234 (FIG. 7) at the central computing site obtains a sample from memory 274, representing a signal L, the distance from the top of pipe 204 to the liquid level surface. Signal L is subtracted in difference unit 125 from the signal D, representing the diameter of pipe 204, to provide a value $h_2$, representing the height of liquid in pipe 204. Computation unit 126 receives this value $h_2$ and the radius R of pipe 204 and performs the function shown to obtain an output $A_W$, wetted area of the pipe.

Next, the quantity $R_H$, hydraulic radius, is determined by divider 127, which divides the cross section of the wetted area $A_W$ by a wetted pipe perimeter $P_W$. Depending upon whether or not pipe 204 is more or less half full, that is, the water level is greater than or less than the radius of the pipe, output $P_{W1}$ from computer 128, or $P_{W2}$ from computer 130, would be provided through selector 132 to divider 127. This selection is controlled by half pipe detector 134, which receives the liquid height high $h_2$ and an input R equal to the radius of the pipe and provides a selected output to divider 127 under the criteria stated. Computers 126, 128, and 130 perform the computations indicated on the blocks, receiving also radius dimension inputs for the pipe in question and the liquid height $h_2$.

Next, computing element 138 solves the problem shown in the box representative of that element, and whereby $R_H^{\frac{2}{3}}$ is multiplied by $S^{\frac{1}{2}}$ times 1.48 and divided by a constant$^H$ of an approximate value of 0.013. The result is an indication of velocity of flow V in feet per second. S is representative of the local slope of pipe 204 in feet per thousand.

Next, velocity in feet per second is multiplied by multiplier 140 by the wetted area $A_W$ to provide an output $Q_{24}$, representative of volume of flow in million gallons per day.

Figure 8:
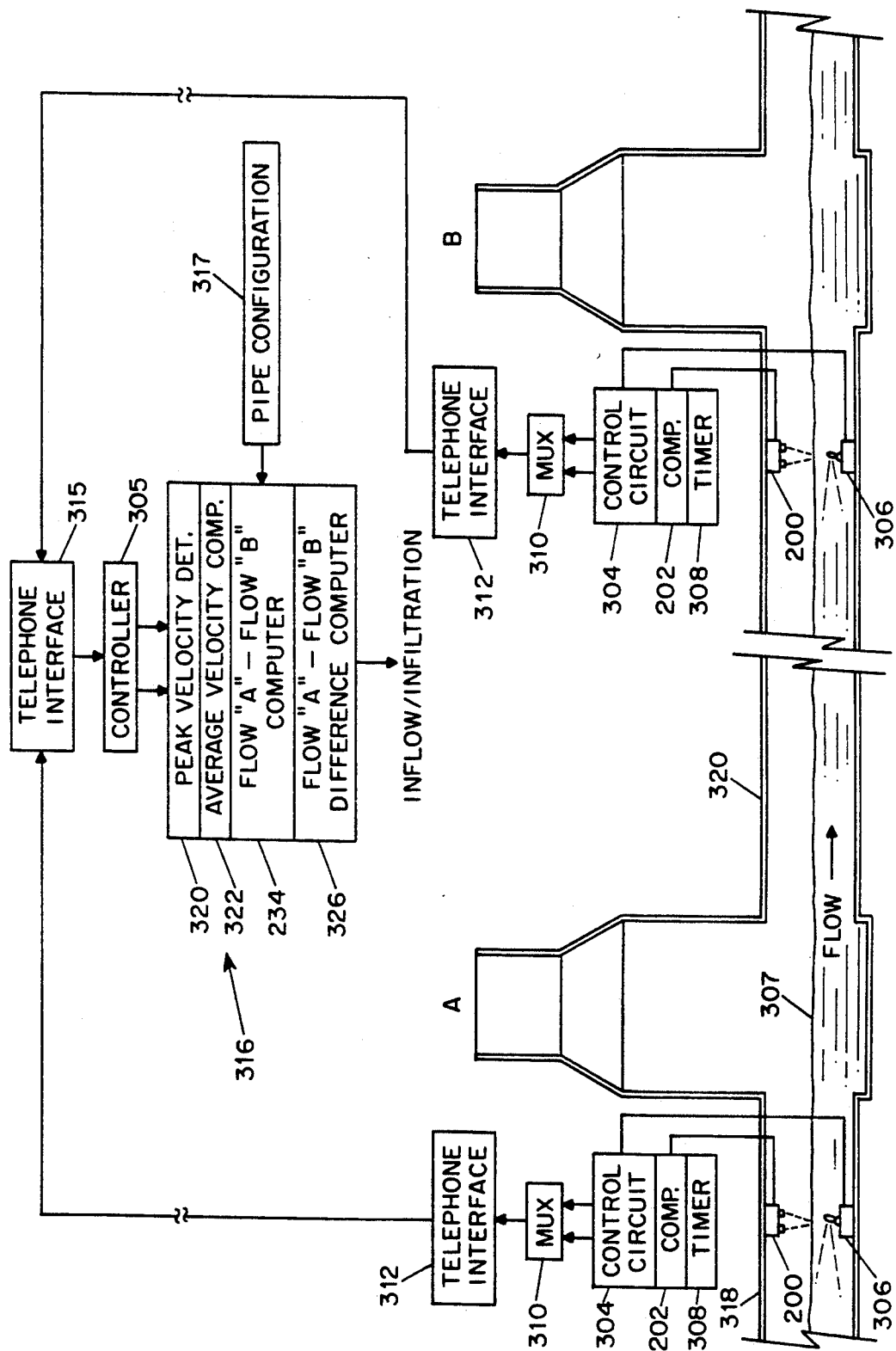
FIG. 8 is a schematic illustration of a flow measurement system.

Additionally, a second method for calculating flow is disclosed in FIG. 7 wherein a velocity measurement (as opposed to computation) in a velocity memory 300 of a Doppler system is input to multiplier 140 via a switch 302 coupled as shown to select a velocity signal from either flow computer 234 or velocity memory 300. Switch 302 may be a solid state switch operated by a control signal or a manually operated switch. Generally, the velocity measurement stored in memory 300 is taken from a Doppler flow measurement system incorporating an ultrasonic transmitter, or transducer, and companion receiver assembly 306 (FIG. 8) to transmit and sense Doppler-shifted return signals, generally directed and received along a direction of flow as shown in FIG. 8. From these sensed return signals, which have a relatively broad spectrum of frequencies, the highest velocity signal is selected by a peak velocity detector 304, and from it, the average velocity, which is 90% of the peak velocity, is computed by average velocity computer 322. In one Doppler system contemplated to be used in the present invention, received Doppler signals may be transformed to a frequency domain by the conventional Fourier Transform approach. Then, the highest observed frequency is selected as representing highest velocity and average velocity computed by multiplying highest velocity by 0.9. An approach such as this is discussed in pending and commonly owned U.S. patent application Ser. No. 440,502. A timer (not shown) provides coded time and date information to velocity memory 300 (FIG. 7) of the Doppler system and liquid level memory 274 and clocks data in these memories as a discrete data stream or segment from a multiplexer 310 (FIG. 8) at selected intervals, typically once every 15 minutes. This time signal is synchronized with other sensor locations in any particular system as illustrates in FIG. 7. The data, in every segment, would then consist of the liquid level and Doppler velocity information, encoded with the time and date as described. A multiplexer 310 in turn provides this data stream to a conventional telephone interface, which couples the data via telephone lines (FIG. 8) to a second telephone interface 315 coupled to a centrally located computer 316, as will be described hereinafter and as in part illustrated in FIG. 7.

By way of example, FIG. 8 illustrates such a Doppler system installed in sewer pipes 318 and 320 between manholes designated site A, an upstream site, and B, a downstream site, and in conjunction with the liquid height measurement system as described above. This system is used to detect inflow and infiltration, the former occurring where there is an undiscovered drainage pipe delivering rain water to the sewer system, and the latter occurring when rain water is infiltrating the sewer system through leaky pipes or the like.

Here, a Doppler transmitter and receiver assembly 306 are mounted in the flow near the bottom of pipes 318 and 320 and provide, via independently directed signals as shown, Doppler-shifted signals to monitor control, circuitry 304 located in the manhole. Computer 202 as described above, is also located in the manhole and receives signals from liquid height sensor 200, directs and receives vertical signals as shown in FIG. 6 and described above, and timer 308 adds to the signals from computer 202 and control circuitry 304 the date and time encoded signal used to synchronize data from sites A and B as described. Multiplexers 310 coupled to computer 202 and circuitry 304 at each of sites A and B multiplex this data and apply liquid level data and Doppler-shifted velocity signals from computer 202 and circuitry 304 to a conventional telephone interface 312 (FIGS. 5 and 8) disposed as described to apply the signals to telephone lines 314, which is coupled to a centrally located computer 316 via telephone interface 313. Computer 316, as shown, includes a peak velocity detector 320 that computes peak velocity from the Doppler-shifted signals in accordance with the Fourier Transform principle as described above. The resulting peak velocity signal is then converted to an average velocity by multiplier 322, which multiplies peak velocity by 0.9, or 90%, and the result is stored in a buffer memory 300 in flow computer 234 (FIG. 7). The liquid level data from computer 202 is stored in a buffer memory 315, and, responsive to a control signal, such as a signal from the buffer memories, indicating data from multiplexers 310 has been read into buffer memories 300 and 315, flow computer 234 computes flow at site A utilizing height data or, by operation of switch 302, computes flow from both measured liquid height and separately measured velocity data. Additionally, as the wetted area of a pipe can be found for a number of differently shaped pipes in accordance with their shape and size, computational unit 126 (FIG. 7) may be provided with computational elements to compute wetted area of one of a variety of pipe configurations, as shown by pipe configuration input 317. Next, flow from the downstream site B is similarly computed, and the respective flows are applied to difference unit 326 (FIG. 8), which subtracts flow at site A from flow at site B. The result is indicative of infiltration or inflow occurring at or between sites A and B, depending on whether the additional flow occurs during or after a rainfall.

From the foregoing, it is to be appreciated that there has been provided a clearly improved measurement system particularly directed to the measurement of sewer flow.

I claim:

1. A first sewage flow monitoring system comprising:
   first liquid height detection means for providing an indication of a wetted area of a sewage flow conduit of a discrete configuration; and
   first velocity sensing means comprising:
      sonic means including at least one transducer immersed in sewage flowing in said conduit and including emitting means for emitting a sonic signal generally along the direction of flow of sewage and detecting echo signals from objects flowing generally along the said direction of flow,
      signal generating means responsive to said sonic means for providing output signals representative of Doppler signals detected by said sonic means,
      multi-signal detection means for receiving the output signals and detecting the presence of a range of different Doppler signals therein,
      discrimination means including means responsive to a maximum value in the range of different Doppler signals from the detection means for providing a selected output which is representative of average velocity of sewage flow through said conduit, and
   flow computation means responsive to said discrimination means and said first liquid height detection means for indicating the volume of flow through said conduit.

2. A system as set forth in claim 1 further comprising:
   second liquid height detection means and second velocity sensing means positioned at a location in said conduit which is spaced from the first liquid height detection means and the first velocity sensing means; and
   means for identifying flow volumes from said first liquid height detection means and velocity sensing means and said second liquid height detection means and velocity sensing means, respectively, whereby the difference in said flow volumes is indicative of extraneous flow into said conduit.

3. A system as set forth in claim 1 wherein said first liquid height detection means comprises:
   ultrasonic transducer means positionable in the top region of said conduit for transmitting and receiving acoustic energy along a generally vertical path;
   signal means coupled to said transducer means and responsive to an input control signal for energizing said transducer means in repetitive bursts of a selected duration of ultrasonic frequency signals to thereby produce bursts of ultrasonic acoustic energy which move downward in a said conduit;
   receiver means comprising:
      filter means coupled to receive signals received by said transducer means and for passing signals corresponding to signal energy proximate to the frequency of the transmitted ultrasonic signals, and
      envelope detection means responsive to the output of said filter means for providing a burst contour signal;
   signal timing means responsive to said envelope detection means and a signal from said signal means corresponding in time to a transmitted signal burst from said transducer means for providing an output signal varying as a function of the period between the transmission of said transmitted signal burst and the reception of said signal burst and for providing an output representative of the distance between said transducer means and the surface of a fluid flowing through said conduit;
   comparator means for comparing a series of outputs from said timing means, each being a sample representative of said distance, with the preselected values and for providing signal outputs in a form of discrete timing signal samples; and
   averaging means responsive to the outputs of said comparator means for averaging said signal samples from said comparator means, and thereby providing an average distance.

4. A system as set forth in claim 1 including means responsive to the indication from said liquid height detection means for computing velocity of the flow from the wetted area of the conduit, and wherein said flow computation means, alternately, employs said computed velocity for computing the volume of flow through said conduit.

5. A system as set forth in claim 4 further comprising a second sewage flow monitoring system, said first sewage flow monitoring system and said second sewage flow monitoring system being positioned at separated upstream/downstream locations in said conduit; and means for identifying flow volumes from said first and second sewage flow monitoring systems, whereby the difference in said flow volumes between the separated locations is indicative of extraneous flow into said conduit between said locations.

6. A system as set forth in claim 5 wherein each of said sewage flow monitoring systems is positioned in the vicinity of a manhole.

7. A method for determining liquid flow velocity within a conduit comprising emitting from a location within a body of liquid in the conduit an acoustic signal which varies at a selected frequency, detecting at a location within the conduit reflected acoustic signals received from the body of liquid in the conduit which have frequency differences from the selected frequency which are representative of the velocities of the liquid at the locations in the body of liquid from which they are reflected, analyzing the acoustic signals received from the body of liquid according to said frequency differences to provide a difference frequency distribution range having a maximum value and determining from the maximum value in the difference frequency distribution range a value representative of the average velocity of the liquid moving in the conduit.

8. A method according to claim 7 wherein the value representative of the average velocity of the liquid is a value corresponding to approximately 90% of the maximum value in the frequency distribution range.

9. A method according to claim 7 including detecting the level of the surface of the liquid within the conduit and determining a fluid flow rate from the average velocity and the liquid level.

10. Apparatus for determining liquid flow velocity within a conduit comprising acoustic signal-generating means disposed within the conduit for emitting an acoustic signal which varies at a selected frequency, acoustic signal-detecting means disposed within the conduit for detecting acoustic signals reflected from a plurality of locations within a body of liquid flowing within the conduit and which have frequencies representative of the velocities of liquid at the plurality of locations within the body, frequency analyzer means for analyzing the acoustic signals received from the body of liquid within the conduit according to said frequencies to provide a frequency distribution range having a maximum value, and selection means for selecting a value based on the maximum value which is representative of the average velocity of the liquid moving in the conduit.

11. Apparatus according to claim 10 wherein said value corresponds to approximately 90% of the maximum value in the frequency distribution range.

12. Apparatus according to claim 10 including liquid level determining means for determining the level of the surface of the liquid within the conduit and flow computing means for determining a rate of flow of liquid within the conduit from the average velocity and the level of the surface of the liquid.

* * * * *